United States Patent [19]

Nersesian

[11] 4,273,721
[45] Jun. 16, 1981

[54] TERTIARY AMINE POLYALKYLENE GLYCOL ESTERS, THEIR ADDITION SALTS AND THEIR QUATERNARY AMMONIUM COMPOUNDS

[75] Inventor: Ara Nersesian, Livingston, N.J.

[73] Assignee: Bristol-Myers Company, New York, N.Y.

[21] Appl. No.: 835,480

[22] Filed: Sep. 21, 1977

Related U.S. Application Data

[60] Division of Ser. No. 415,062, Nov. 12, 1973, abandoned, which is a continuation of Ser. No. 86,965, Nov. 4, 1970, abandoned.

[51] Int. Cl.³ .............. C09F 5/00; C07C 67/02; A61K 7/06
[52] U.S. Cl. ................ 260/404; 560/252; 424/70; 8/115.6
[58] Field of Search .............. 260/404, 567.2; 424/70, 424/312, 329; 560/252

[56] References Cited

U.S. PATENT DOCUMENTS

| | | | |
|---|---|---|---|
| 2,255,252 | 9/1941 | Harris | 260/404 X |
| 2,677,700 | 5/1954 | Jackson | 260/404 X |
| 3,155,591 | 11/1964 | Hilfer | 260/404 X |
| 3,342,840 | 9/1967 | Sobolev | 260/404 |

*Primary Examiner*—John F. Niebling
*Attorney, Agent, or Firm*—Irving Holtzman; George A. Mentis

[57] ABSTRACT

Tertiary amine esters e.g.

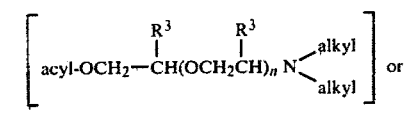

or

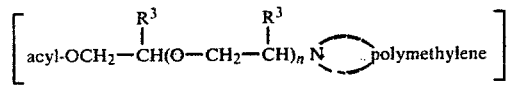

their acid addition salts and their quaternary ammonium compounds.

6 Claims, No Drawings

TERTIARY AMINE POLYALKYLENE GLYCOL ESTERS, THEIR ADDITION SALTS AND THEIR QUATERNARY AMMONIUM COMPOUNDS

This is a division, of application Ser. No. 415,062, filed Nov. 12, 1973, abandoned, a continuation of Ser. No. 86,965, filed Nov. 4, 1970, abandoned.

This invention relates to certain tertiary amine esters, their acid addition salts and their quaternary ammonium compounds. More particularly, it relates to compounds of the formula

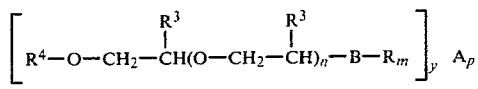

wherein:

B is selected from the group consisting of

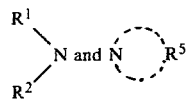

in which $R^5$ is tetramethylene or lower alkyl substituted tetramethylene or pentamethylene or lower alkyl substituted pentamethylene;

$R^1$ and $R^2$ are alkyl (e.g. 1 to 18 carbon atoms) or aralkyl (e.g. phenylalkyl such as benzyl, phenylethyl, etc.);

$R^3$ is hydrogen or lower alkyl (e.g. 1 to 8 carbon atoms);

R is hydrogen, alkyl (e.g. 1 to 18 carbon atoms); aryl or aralkyl;

$R^4$ is carboxy acid acyl radical (e.g. containing from 2 to 26 carbon atoms);

n has an average value of from about 5 to 50 and preferably from about 7 to 40 inclusive;

A is an anion;

m is 1 or zero;

p is 1 or zero; p being zero only when m is also zero; and y is a number equal to the valence of anion A. It is clear that when m and p in Formula I above are both zero, this formula defines a tertiary amine. On the other hand, when m and p are 1, this formula describes an acid addition salt (i.e. when R is hydrogen) or a quaternary ammonium compound (i.e. when R is alkyl).

In a preferred form of this invention, the values ascribed to the radicals in Formula I above are as follows:

(a) R, $R^1$, $R^2$ and $R^3$ are the same or different alkyl radicals having from 1 to 18 carbon atoms and particularly from 1 to 4 carbon atoms;

(b) m and p are 1;

(c) n has an average value of from 7 to 40;

(d) $R^4$ is a carboxy acid acyl radical having 2 to 18 carbon atoms; and (e) y is 1 to 3.

However, optimum results are obtained with compounds of the following formula:

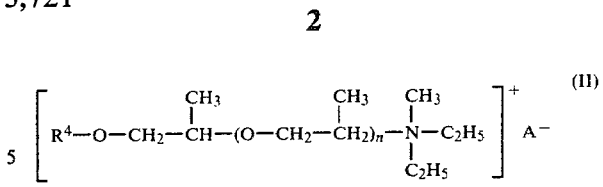

wherein $R^4$ is a carboxy acid acyl radical having from 2 to 26, and preferably 2 to 18 carbon atoms;

n is a number from 7 to 40; and $A^-$ is a halide (e.g. chloride, bromide).

When R, $R^1$, $R^2$, $R^3$ are alkyl radicals in Formula I above, they may be straight chain or brached chain and may contain up to 18 carbon atoms. These include, methyl, ethyl, n-propyl, isopropyl, n-butyl, tert-butyl, n-pentyl, n-hexyl, n-heptyl, 2-methyl-pentyl, n-octyl, n-decyl, n-undecyl, n-dodecyl, n-tridecyl, n-tetradecyl, n-pentadecyl, n-hexadecyl, n-heptadecyl, n-octadecyl, etc.

When R is aryl or aralkyl, it may be any of a variety of these radicals. Thus, for example, it may be phenyl, benzyl or phenylethyl radicals or their methyl or ethyl nuclear substituted radicals, e.g. methyl benzyl, dimethyl benzyl, tolyl, nonylphenol, octylphenol, etc.

As noted above, $R^4$ in Formulas I and II are carboxy acid acyl radicals which may contain 2 to 26 carbon atoms or preferably 2 to 18 carbon atoms. The types of acids from which these acyl radicals may be derived are also quite varied. These include saturated and unsaturated fatty acids which may or may not carry other substituents or functional groups. Typical among the substituents that may be carried on the saturated or unsaturated fatty acid, mention may be made of phenyl; phenylalkyl, e.g. benzyl, phenylethyl; hydroxy, etc. Other acids which are useful as a source of the carboxy acyl radical are the aromatic acids and particularly the substituted and unsubstituted benzoic acids such as salicylic and p-aminobenzoic acid. Also of use as a source of acid acyl radical are the heterocyclic acids and the cycloalkanoic acids (substituted and unsubstituted).

A number of carboxy acid compounds are known in the prior art which exert certain pharmacological or biological activity to the skin and hair or its environment when applied thereto or otherwise provide beneficial properties when so applied. However, because these acids are not sufficiently substantive to skin and hair, their action or benefit is short lived and transitory. The present invention provides a means for making these acid materials more hair or skin-substantive. This is accomplished by incorporating the active acid into the molecular structures of the present invention as the acyl radical defined by $R^4$ in Formulas I or II above. Among the acids of this character, mention may be made of the following: acetyl salicylic, salicylic, p-aminobenzoic, isostearic and undecylenic acids.

By way of further illustrating the various acids from which the acyl radical $R^4$ may be derived, mention may be made of the following:

(a) saturated fatty acids: acetic, propionic, n-butyric, isobutyric, n-valeric, trimethylacetic, caproic, n-heptylic, caprylic, capric, lauric, myristic, palmitic, stearic, arachidic, behenic, lignoceric and cerotic;

(b) unsaturated fatty acids: $\Delta^9$-decylenic, undecylenic, palmitoleic, petroselinic, linolenic, parinaric, cinnamic, cetoleic, stillingic, oleic, vaccenic, eleostearic, gadoleic, erucic, $\Delta^9$-dodecylenic, ricinoleic, linoleic, licanic, arachidonic and selacholeic, (c) aromatic acids: benzoic acid, p-nitrobenzoic acid, p-aminobenzoic acid, salicylic, acetyl salicylic and p-hydroxybenzoic;

(d) cycloalkanoic acids: cyclohexane carboxylic, 3-methyl cyclohexane carboxylic and cyclopentane carboxylic.

(e) heterocyclic acids: pyrrolidone carboxylic acid, isonicotinic acid and furoic.

The anion A in Formulas I and II above can be any negative or salt-forming radical as, for instance, halide such as chloride, bromide and iodide; hydroxide; sulfate, alkyl-sulfuric acid such as methyl sulfuric acid or ethyl sulfuric acid (methosulfate or ethosulfate); nitrate, phosphate; acetate; formate; toluene sulfonate, carbonate; lower alkyl (1 to 4 carbon atoms) sulfonic acids; and the like. Of particular importance are those compounds in which the anion is chloride or bromide. Various of said anionic radicals can be introduced directly into the molecules as described below; and, in case of others, they can be made, for instance, by substitution for halogen in a quaternary compound of the present invention by known techniques as, for instance, by metathesis procedures.

PRIOR ART

The tertiary amine alcohols of the general formula:

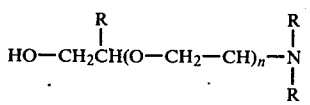

and their corresponding quaternary amine compounds are known in the prior art. In this connection, attention is directed to U.S. Pat. Nos. 3,123,640; 3,123,641; 3,141,905; 3,155,591 and British Pat. No. 1,055,128. These products, however, suffer from certain disadvantages which make them unsuitable for many uses. Thus, for example, some of these products are tacky and therefore not particularly suitable for certain hair and skin preparations. Moreover, the emollient and substantive characteristics of some of these materials leave much to be desired.

The esters of the present invention have better emollient and substantive properties than the corresponding alcohols, particularly when used in bath and hair preparations. Moreover, they are less tacky, having better hair and skin lubricating properties and have more slip than the alcohols. Furthermore, they have better anti-static properties than the alcohols.

UTILITY

The compounds of the present invention have a variety of uses. Thus, they are useful as substantive emollients in skin softening preparations. They are also useful as anti-static, conditioning, and grooming agents in hair preparations. Moreover, they may be used as cationic emulsifiers in cosmetic and non-cosmetic preparations, as lubricants in textiles, and as coupling agents to aid in increasing the mutual solubility of two otherwise less soluble materials. They may be used in aqueous, alcoholic or oily bases.

PROCESS

In preparing the tertiary amine esters of the present invention, it is preferred to react the tertiary amino alcohols of the formula:

with an acylating agent. B and $R^3$ in Formula III have the same value ascribed to them above in connection with Formula I. Any of the well-known acylating agents may be used in this process. Among these may be mentioned the acid chlorides, acid anhydrides, and acids with various catalytic agents such as mineral acids, p-toluene sulfonic acid, dicyclohexylcarbodiimide, etc. However, it is preferred to employ an acid chloride for this purpose of formula $R^4Cl$ wherein $R^4$ is a carboxy acid acyl radical defined above in connection with Formulas I and II.

The tertiary amino alcohols of Formula III above are prepared by condensing a secondary amine of formula

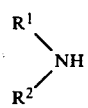

with n moles of an alkylene oxide

in the presence of a conventional oxyalkylation catalyst such as sodium hydroxide or potassium hydroxide; $R^1$, $R^2$, $R^3$ and n having the same value ascribed to them in connection with Formula I above. This process is described in more detail in U.S. Pat. Nos. 3,123,640 and 3,123,641 which, as noted above, incidentally also show the preparation of the corresponding quaternary compounds of these tertiary amino alcohols.

In preparing the quaternary amine compounds encompassed in the present invention, it is preferred to quaternize the esterified tertiary amine alcohol rather than first quaternizing the tertiary amine alcohol and then esterifying this quaternized tertiary amine alcohol. The former procedure avoids the presence of large amounts of acids which would have to be neutralized. Moreover, the tertiary amino alcohol or its esters are more readily separated from the glycol by-product which is present as an impurity in the starting material.

Any of the well-known quaternizing procedures may be employed in converting the tertiary amine esters into the corresponding quaternary amine compounds. In one process, in addition to the quaternizing agent (e.g. alkyl halide) anhydrous $K_2CO_3$ is added to the quaternizing reaction mixture to remove water and neutralize acid (e.g. HCl) which is liberated due to the presence of water. When this procedure is carried out where there is no danger of the reactants picking up moisture, the $K_2CO_3$ can be dispensed with. Similarly, in preparing the acid addition salts procedures well known in the prior art may be employed. In one process a sample of the amine alcohol ester containing one molar equivalent of amine group is dissolved in ethanol (other organic solvents such as methanol, ether, acetone may be used). It is then treated with a solution of one molar equivalent of hydrogen chloride in ethanol with external ice cooling. (The same solvents may be used and other acids such as p-toluene sulfonic may be used). After addition is complete, the solvent is removed in vacuo to leave the acid addition salt.

The following examples are further illustrative of the present invention. It is to be understood, however, that the invention is not limited thereto. In these examples, when the following terms appear they have the meaning described below.

Emcol CC-9 Amine; Emcol-36 Amine and Emcol CC-42 Amine:

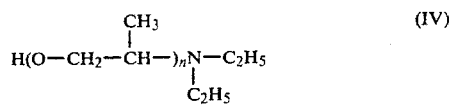

Emcol CC-9 Amine; n in above Formula IV has an average value of 8;

Emcol CC-36 Amine; n in above Formula IV has an average value of 25;

Emcol CC-42 Amine; n in above Formula IV has an average value of 40.

EXAMPLE 1

Emcol CC-9 Amine Acetate:

Hydroxyl determination indicated that the Emcol CC-9 Amine employed contains 2.17 meq. of hydroxyl per gram. To a refluxing solution of 2.81 grams (35.8 meq.) of redistilled acetyl chloride in 20 cc of anhydrous ether under nitrogen was added 15 grams (32.5 meq.) of Emcol CC-9 Amine slowly over a period of 75 min. The pale yellow solution was refluxed an additional 2½ hours. It was then cooled to room temperature, made more acidic with 2 N HCl, and added to 40 cc of water. After extracting twice with ether, the aqueous layer was brought to pH 9.5 with conc. NH$_4$OH. It was then extracted several times with ether and dried over sodium sulfate.

The acidic ether extract yielded 1.9 grams (negative nitrogen test). The basic ether extract yielded 13.5 grams of the desired tertiary amino acetate ester. Perchloric acid titration of this product indicated there was 2.01 meq. of amine per gram. The infrared spectrum indicated a diethylamino group, the acetate carbonyl, and lack of any hydroxyl group.

EXAMPLE 2

Emcol CC-9 Amine Laurate:

To a refluxing solution of 26.2 grams (119.4 meq.) of lauroyl chloride in 200 ml of anhydrous ether was added 50 grams (108.5 meq.) of Emcol CC-9 Amine over a period of 80 min. The solution was refluxed an additional 2½ hours. After cooling to room temperature, it was made more acidic with 2 N HCl and added to 250 ml of water. After two extractions with ether, the aqueous portion was brought to pH 9.5 with conc. NH$_4$OH. At this point an oil layer formed at the top and it was removed and dissolved in ether and dried over sodium sulfate.

The acidic ether extract yielded 5.2 grams of a white waxy solid. The basic ether extract yielded 45.7 grams of tertiary amino laurate ester after evaporation of solvent in vacuo. Analysis indicated there was 1.54 meq. of amine per gram.

EXAMPLE 3

Emcol CC-9 Amine Sterate:

To a solution of 12.3 (40.7 meq.) of stearoyl chloride in 150 ml of dry benzene was added 15 grams (32.6 meq.) of Emcol CC-9 Amine. The resulting solution was refluxed for five hours, cooled to room temperature and evaporated to dryness in vacuo. The residue was dissolved in 150 ml of warm water and brought to pH 9.5 with conc. NH$_4$OH. On extraction with ethyl acetate, some insoluble solid formed which was removed by filtration. After several extractions, the combined ethyl acetate extracts were evaporated to dryness in vacuo and to the residue was added 150 ml of water and enough 6 N H$_2$SO$_4$ to bring the pH to 1. It was then extracted several times with ethyl acetate, made basic with 5 N NaOH, extracted several times with ethyl acetate, and dried over sodium sulfate. The acidic extract yielded 5.3 grams. The basic extract yielded 12.4 grams of tertiary amino stearate ester. Analysis indicated there was 1.37 meq. of amine per gram.

EXAMPLE 4

Purification of Emcol CC-36 Amine:

100 grams of Emcol CC-36 Amine, which contained 0.63 meq. of amine per gram and 1 meq. of hydroxyl per gram, was stirred in 700 ml of ice water. 20 ml of conc. H$_2$SO$_4$ was added slowly and the resulting clear solution was extracted with 3×300 ml of cyclohexane. The aqueous layer was then brought to pH 9.5 with 5 N NaOH and extracted with 3×300 ml of ether. On removal of the ether, 80.6 grams was obtained. Analysis indicated 0.75 meq. of hydroxyl per gram and 0.75 meq. of amine per gram.

EXAMPLE 5

Emol CC-36 Amine Acetate (non-purified)

To a refluxing solution of 14.1 grams (180 meq.) of acetyl chloride in 300 ml of anhydrous ether was added 150 grams (150 meq.) of Emcol CC-36 Amine over a period of two hours. The solution was refluxed an additional 2½ hours. After cooling to room temperature, it was added to 400 ml of water and brought to pH 9.5 with 5 N NaOH. It was then extracted several times with ether and dried over sodium sulfate. On removal of the ether in vacuo, 128.7 grams was obtained. Analysis indicated 0.64 meq. of amine per gram.

EXAMPLE 6

Emcol CC-36 Amine Acetate:

To a refluxing solution of 6.6 grams (83.6 meq.) of acetyl chloride in 300 ml of anhydrous ether was added 100 grams (76 meq.) of purified Emcol CC-36 Amine over a period of 80 min. The solution was refluxed an additional 3 hours, cooled to room temperature, added to 400 ml of water, and brought to pH 9.5 with 5 N NaOH. After several ether extractions, it was dried over sodium sulfate. On removal of the ether in vacuo, 95.1 grams was obtained. Analysis indicated 0.72 meq. of amine per gram.

EXAMPLE 7

Emcol CC-36 Amine Laurate:

To a refluxing solution of 10.4 grams (47.3 meq.) of lauroyl chloride in 360 ml of anhydrous ether under nitrogen was added 60 grams (45 meq.) of purified Emcol CC-26 Amine over a period of one hour. The solution was refluxed an additional five hours and evaporated to dryness. The residue was added to 900 ml of water and the pH was brought to 8.0 with 5 N NaOH. It was then extracted several times with ethyl acetate and dried over sodium sulfate. Yield 60.7 grams. Analysis indicated 0.70 meq. of amine per gram.

EXAMPLE 8

Emcol CC-36 Amine Stearate:

To a refluxing solution of 7.64 grams (25.2 meq.) of stearoyl chloride in 200 ml of dry benzene was added 30 grams (24.0 meq.) of purified Emcol CC-36 Amine. After addition was complete, the solution was refluxed an additional five hours and evaporated to dryness. The residue was added to 600 ml of water and brought to pH 8.0 with 5 N NaOH. It was then extracted with 2×400 ml of a 50:50 mixture of ethyl acetate and cyclohexane. Yield 26.2 grams. Analysis indicated 0.60 meq. of amine per gram.

EXAMPLE 9

Quaternizing the Emcol Amine Esters:

Each of the above Emcol Amine esters, i.e. Emcol CC-9 Amine acetate, Emcol CC-9 Amine laurate, Emcol CC-9 Amine stearate, Emcol CC-36 Amine acetate, Emcol CC-36 Amine laurate, Emcol CC-36 Amine stearate was quaternized using the following procedure:

One hundred grams of the Emcol Amine ester was dissolved in acetone, 10-15 grams of anhydrous $K_2CO_3$ was added, and a 10% excess of methyl chloride, and the resulting mixture was heated in an autoclave for 12 hours at 60° C. The reaction mixture was then filtered and the solvent removed in vacuo.

In an alternative procedure, 100 grams of the Emcol Amine ester was dissolved in 75-100 ml of acetone; 10-15 grams of anhydrous $K_2CO_3$, and a 300% excess of liquid methyl chloride were added. The resulting mixture was heated at 60° C. for 12 hours in a sealed vessel. It was then filtered and the solvent was removed in vacuo.

EXAMPLE 10

Preparation of Emcol Amine Ester Acid Addition Salts:

Each of the above Emcol Amine esters, i.e. Emcol CC-9 Amine acetate, Emcol CC-9 Amine laurate, Emcol CC-9 Amine stearate, Emcol CC-36 Amine acetate, Emcol CC-36 Amine laurate and Emcol CC-36 Amine stearate were used to prepare the corresponding hydrochloride salts using the following procedure:

A sample of the Emcol Amine ester containing one molar equivalent of amine group was dissolved in ethanol. This solution was then treated with 1 molar equivalent of hydrogen chloride in ethanol with external ice cooling. After the addition of the hydrogen chloride reactant was complete, the solvent was removed in vacuo to leave the hydrochloride addition salt.

EXAMPLE 11

Emcol CC-9 Amine p-Nitrobenzoate:

To a refluxing solution of 4.95 g (26.6 meq.) of p-nitrobenzoyl chloride in 40 ml of anhydrous ether was added 10 g (24.2 meq.) of Emcol CC-9 Amine over a period of 25 minutes. The solution was refluxed an additional 2½ hours. After cooling to room temperature, it was made more acidic with 2 N HCl and added to 30 ml of water. After several ether extractions, the aqueous portion was brought to pH 9.5 with 5 N NaOH. It was then extracted several times with ether and dried over sodium sulfate. The basic ether extract yielded 8.5 g of product. Analysis indicated 2.02 meq. of amine per gram.

EXAMPLE 12

Quaternary Emcol CC-9 p-Nitrobenzoate:

120 g (242.4 meq.) of Emcol CC-9 Amine p-nitrobenzoate of Example 11 was dissolved in 75 ml of acetone. To this was added 15 g of anhydrous potassium carbonate and a 25% excess of liquid methyl chloride. The reaction mixture was heated at 60° C. for 12 hours in a sealed vessel. After cooling to room temperature, it was filtered and evaporated to dryness. There was 135 g of product which contained 1.77 meq. of amine per gram.

EXAMPLE 13

Quaternary Emcol CC-9 p-Aminobenzoate;

90 g (159.3 meq.) of the quaternary Emcol CC-9 Amine p-nitrobenzoate of Example 12 was dissolved in 200 ml of ethanol. To this was added 250 mg of platinum dioxide and the reaction mixture was shaken with 50 p.s.i. of hydrogen in the Parr hydrogenation apparatus. After the uptake of hydrogen had ceased, the reaction mixture was filtered and evaporated to dryness in vacuo. There was 88.4 g of product after the solvent had been removed thoroughly.

What is claimed is:

1. Compounds of the formula:

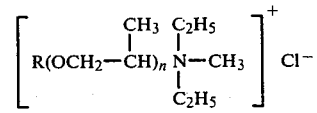

wherein R is selected from the group consisting of acetyl, stearyl and lauroyl and n has an average value of 8 or 25.

2. The compound of claim 1 having the formula:

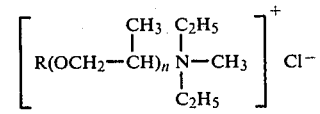

wherein R is lauroyl and n has an average value of 8.

3. The compound of claim 1 having the formula:

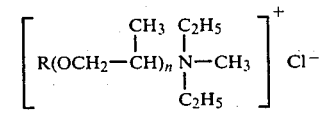

wherein R is stearyl and n has an average value of 8.

4. The compound having the formula:

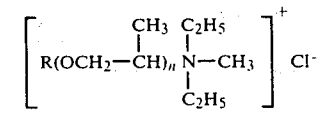

wherein R is acetyl and n has an average value of 25.
5. The compound of claim 1 having the formula:
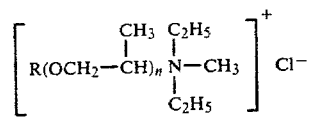
wherein R is stearyl and n has an average value of 25.
6. The compound of claim 1 having the formula:
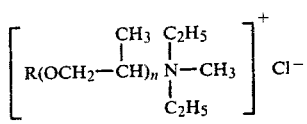
wherein R is lauroyl and n has an average value of 25.
* * * * *